United States Patent [19]
Casebier et al.

[11] 3,966,708
[45] June 29, 1976

[54] AMINATED SULFITE DERIVATIVES OF CONIFEROUS BARKS

[75] Inventors: Ronald Leroy Casebier; Karl David Sears, both of Shelton, Wash.

[73] Assignee: International Telephone and Telegraph Corporation, New York, N.Y.

[22] Filed: July 3, 1972

[21] Appl. No.: 268,595

[52] U.S. Cl............................ 260/236.5; 260/345.2; 260/473.5; 71/23
[51] Int. Cl.²........................................ C07G 17/00
[58] Field of Search............ 260/236.5, 345.2, 473.5

[56] References Cited
UNITED STATES PATENTS

| | | | |
|---|---|---|---|
| 2,823,223 | 2/1958 | Steinberg et al.................. | 260/473.5 |
| 2,831,022 | 4/1958 | Van Blaricom et al......... | 260/512 R |
| 3,270,003 | 8/1966 | Van Blaricom et al.......... | 260/473.5 |

FOREIGN PATENTS OR APPLICATIONS

| | | | |
|---|---|---|---|
| 8,582 | 3/1897 | United Kingdom.............. | 260/473.5 |

OTHER PUBLICATIONS

Name Reactions in Organic Chemistry – Surrey (1954), Academic Press, Inc., pp. 21–22.

Angew. Chem. Int. Ed. Eng. 6 : 307 (1967).

*Primary Examiner*—Sherman D. Winters
*Attorney, Agent, or Firm*—J. B. Raden; H. J. Holt

[57] ABSTRACT

Polyphenolic components of coniferous tree barks are reacted with a concentrated aqueous solution containing ammonia and sulfur dioxide to produce aminated sulfite reaction products having high nitrogen contents. The products have a number of valuable applications including utility in the agricultural field. The reaction takes place at temperatures of 130° – 190°C., the ratio of $NH_3$/bark is within the range of 0.2 – 1.2 and ratio of $SO_2$/bark is within the range of 0.25 – 0.4, on a weight basis.

9 Claims, No Drawings

AMINATED SULFITE DERIVATIVES OF CONIFEROUS BARKS

This invention relates to aminated sulfite derivatives of the heterocyclic polyphenolic components of coniferous tree barks and to a process for their preparation.

Coniferous barks are frequently considered a waste by-product of logging and pulping operations. Considerable effort has therefore been directed to extracting and utilizing the chemicals available in such barks. These efforts are becoming even more significant with the increasing emphasis on ecology.

A number of useful derivatives of coniferous barks have been developed and many have found acceptance in a number of applications such as drilling mud additives, agricultural micronutrients and grouting formulations. Among these derivatives are the sulfonic acid salts of hemlock barks disclosed in U.S. Pat. No. 2,831,022, assigned to the present assignee. Reaction products resulting from the digestion of coniferous barks with aqueous ammonia are disclosed in U.S. Pat. No. 2,823,223, also assigned the present assignee. However, the combined chemical and physical uses of bark are relatively minor compared to the overall available quantity.

It is known that naphthylamines may be prepared from naphthols in the presence of aqueous sulfite or bisulfite and ammonia. The reaction, known as the Bucherer reaction, is very selective in that it is essentially limited to pure chemicals of the naphthalene, anthracene and phenanthrene series and to resorcinol. Bark is known to contain heterocyclic polyphenolic substances commonly called flavanoid units. Insofar as is known, the Bucherer reaction has never been considered applicable to heterocyclic polyphenolics such as those found in coniferous barks or to related polymeric materials.

It has now been found that aminated sulfite derivatives of coniferous tree bark containing an unusually high nitrogen content can be prepared from coniferous tree bark by reaction under carefully controlled conditions with ammonia and sulfur dioxide. The reaction is believed to occur with the polyphenolic flavanoid units of the coniferous tree bark. Gross yields of the aminated sulfite derivatives of 90 – 95 percent based on the weight of the dry bark can be consistently obtained. The process is relatively simple, the chemicals used are inexpensive and the yields unexpectedly high. The product has utility as a metal complexing agent for micronutrient additions in the agricultural field and as a fertilizer. Other related applications will occur to those skilled in the art for the relatively high nitrogen content derivative.

Successful preparation of the product depends upon certain critical process features. The ammonia/bark ratio ($NH_3$:bark) should be within the range of about 0.2 – 1.2 and preferably at least about 0.5 on a weight basis. Under a ratio of about 0.5, the amine substitution level drops off; between 0.5 and 0.9, the substitution level of primary amino groups per monomeric flavanoid unit will be from 0.80 – 0.90. Above an ammonia to bark ratio of 0.90, the rate of amine substitution again decreases.

The $SO_2$:bark ratio should be within the range of about 0.25 – 0.4 on a weight basis, preferably between 0.3 and 0.35. Within these ranges, increasing $SO_2$ content primarily acts to increase yield. The temperature of the reaction is quite critical and should be kept within the range of about 130°C – 190°C. Below 150°C., and particularly below 130°C, both yield and level of amine substitution drop off sharply and above 170°C., and particularly 190°C., the reaction product starts to break down.

The reaction normally goes to completion within an hour. However, the reaction product is quite stable under the reaction conditions and additional reaction time has no apparent detrimental effect on either yield or amine level. A reasonable upper limit of reaction time is about six or even more hours, but reaction time is not a particularly critical parameter.

In a typical process of the invention, comminuted coniferous bark or bark extract and concentrated aqueous ammonium hydroxide-ammonium sulfite solution are placed in a suitable pressure vessel in the proportions indicated above. In placed of ammonium hydroxide, ammonia may be added to the aqueous solution and ammonium sulfite may be replaced by sulfur dioxide or ammonium bisulfite. The reactants should be added at the same time. The vessel is sealed and the reaction mixture brought to temperature with stirring and reacted for from 1 – 6 hours. The mixture is then cooled, filtered to remove undissolved bark residue, and the excess ammonia removed by boiling or vacuum distillation as desired. The aminated sulfite bark derivative is then recovered from the solution as a reactive dark brown powder by suitable means such as spray drying.

Yields as high as 90 – 95 percent by weight based on the dry bark used are obtained. The yields are unexpectedly high — about twice the yield normally obtained using either ammonium sulfite or ammonium hydroxide alone. The combination of ammonium sulfite with ammonium hydroxide under the stated conditions apparently breaks down the higher weight polymeric fractions of the bark and dissolves the more easily solubilized tannin fractions. This favorable combination results in an increased recovery of aminated sulfite derivative. The products typically have a total nitrogen content of 8.9 – 10.9 percent with 2.7 – 3.6 percent being organically combined. This level of nitrogen incorporation corresponds to approximately 0.9 primary amino groups per monomeric flavanoid unit.

The following examples are given by way of illustration. All parts are by weight unless otherwise indicated.

EXAMPLE 1

This example illustrates the preparation of an aminated sulfite derivative prepared from a coniferous bark extract. The bark extract was a spray dried sulfite-bisulfite extract in which the pH had been adjusted to slightly on the acid side. A 200 ml. aqueous solution containing 50 grams of the bark extract was placed in an autoclave and a mixture of freshly prepared ammonium sulfite (33 ml.) and ammonium hydroxide (75 ml.) was added. The ammonium sulfite was prepared from 33 ml. of cold concentrated ammonium hydroxide added to 50 ml. of cold sulfurous acid-ammonium bisulfite liquor (44.0 percent $SO_2$, 611 grams $SO_2$ per liter total, 311 grams $SO_2$ per liter free). The autoclave was sealed and the reaction mixture heated to 150°C. for 8 hours during which time the maximum pressure was 88 psig, and the mixture was cooled and electrodialyzed to remove inorganic contaminants. The resulting solution was concentrated and freeze-dried to give 49.6 grams of black powder reaction product.

EXAMPLE 2.

This example illustrates the preparation of aminated sulfite derivative from ground hemlock bark. Cold concentrated ammonium hydroxide (108 ml.), 50 ml. of sulfur dioxide-ammonium bisulfite liquor (44.0 percent $SO_2$, 611 grams per liter total $SO_2$, 311 grams per liter free $SO_2$) and 410 ml. of water were added to an autoclave containing 199.2 grams of hemlock bark (100 grams oven-dried). The stirred reaction mixture was heated to 170°C over a period of 20 minutes and maintained at that temperature for 0.5 hour.

The cooled reaction was centrifuged and the supernatant was filtered and concentrated. The red-brown solution was desalted by electrodialysis and freeze-dried to produce 63.3 grams of reaction products.

EXAMPLE 3

Cold, concentrated ammonium hydroxide (200 ml.), 50 ml. of sulfur dioxide-ammonium bisulfite liquor (62.1 percent $SO_2$, 621 grams $SO_2$ per liter total, 320 grams $SO_2$ per liter free) and water (320 ml.) were added to an autoclave containing ground hemlock bark (146.0 g), 100 g. oven-dried). The ammonia to bark ratio was 0.52. The stirred reaction mixture was heated to 170°C. (20 min.) and maintained at the temperature 1.0 hour (maximum pressure 182 psig). The cooled reaction mixture was filtered. The insoluble bark residue was dried in an oven and weighed 40.7 g. The filtrate was boiled for about 6 hours to remove amonia. The solution was then freeze-dried to yield 94.6 g. of reaction product.

The following Table I shows the results of a number of additional examples, carried out essentially as described in Example 3, to illustrate the effect of temperature on yield and nitrogen content as well as the effect of reaction time at varying temperatures on these values.

TABLE I

| Sample No. | Time, Hr. | Temp., °C. | Yield (Wt.) % | Insoluble Bark Residue Weight | Total N, % | Ammoniacal N, % | Combined N, % |
|---|---|---|---|---|---|---|---|
| 1 | 1 | 150 | 83.7 | 50.5 | 9.1 | 7.0 | 2.1 |
| 2 | 2 | 150 | 87.1 | 47.6 | 9.4 | 7.0 | 2.4 |
| 3 | 4 | 150 | 85.3 | 46.7 | 9.5 | 6.5 | 3.0 |
| 4 | 6 | 150 | 83.1 | 48.3 | 9.3 | 6.7 | 2.6 |
| 5 | 1 | 160 | 93.4 | 49.4 | 9.2 | 7.0 | 2.2 |
| 6 | 2 | 160 | 94.1 | 45.5 | 9.4 | 7.0 | 2.4 |
| 7 | 4 | 160 | 95.5 | 44.8 | 9.5 | 7.0 | 2.5 |
| 8 | 6 | 160 | 89.7 | 41.9 | 9.3 | 6.5 | 2.8 |
| 9 | 1 | 170 | 94.6 | 40.7 | 10.5 | 7.9 | 2.6 |
| 10 | 2 | 170 | 92.1 | 41.5 | 10.6 | 7.4 | 3.2 |
| 11 | 4 | 170 | 94.9 | 37.7 | 10.2 | 7.4 | 2.8 |
| 12 | 6 | 170 | 96.4 | 35.7 | 10.0 | 7.0 | 3.0 |

Combined nitrogen, as listed in Table I, and referred to herein as organically combined nitrogen, is the difference between the value for total nitrogen determined by the Kheldahl method (using sulfuric acid digestion) and the value for ammoniacal nitrogen determined by titration of the ammonia liberated with sodium hydroxide.

It is apparent from Table I that total nitrogen content increases at the higher temperatures, the yields being greater at 160° and 170°C. levels than at 150°C. The combined nitrogen content is also slightly higher at 170°C. The effect of time upon yield does not appear to be significant; nor does nitrogen content appear to be significantly affected by time.

EXAMPLE 4

Cold, concentrated ammonium hydroxide (300 ml.), 50 ml. of sulfur dioxide-ammonium bisulfite liquor (62.1 percent $SO_2$ 621 grams $SO_2$ per liter total, 320 grams $SO_2$ per liter free) and water (320 ml.) were added to an autoclave containing ground hemlock bark (146.0 g., 100 g. O.D.). The stirred reaction mixture was heated to 170° (15 min.) and maintained at the temperature 2.0 hours (maximum pressure - 244 psig). The cooled reaction mixture was filtered. The insoluble bark residue was dried in an oven and weighed 38.5 g. The filtrate was boiled for about 6.5 hours to remove ammonia. The solution was then freeze-dried to give 92.7 g. of yield. In the following Tables II and III, reactions were carried out substantially as set forth in Example 4. Table II used successive 70 ml. incremental increases of $NH_4OH$ concentration beginning with 100 ml. in Sample 1. In Table III, successive Table II

| Sample No. (a) | Conc.NH$_4$OH, %(Vol.) | NH$_3$:Bark (w/w) | Time, Hr. | Temp., °C. | Yield (Wt.) % | Insoluble Bark Residue Wt. | Total N, % | Ammoniacal N, % | Combined N, % |
|---|---|---|---|---|---|---|---|---|---|
| 1 | 17.8 | 0.26 | 4 | 170 | 75.1 | 48.2 | 10.2 | 7.9 | 2.3 |
| 2 | 29.8 | 0.44 | 4 | 170 | 77.7 | 56.8 | 11.1 | 8.9 | 2.2 |
| 3 | 42.1 | 0.63 | 4 | 170 | 76.9 | 57.2 | 11.3 | 8.6 | 2.7 |
| 4 | 54.4 | 0.81 | 4 | 170 | 79.0 | 59.2 | 11.1 | 8.2 | 2.9 |
| 5 | 66.7 | 0.99 | 4 | 170 | 64.1 | 70.9 | 11.4 | 9.2 | 2.2 |
| 6 | 79.0 | 1.17 | 2 | 170 | 59.6 | — | 11.5 | 8.9 | 2.6 |

(a) $SO_2$ Liquor analyzed as: 515 g/l total $SO_2$, 255 g/l free $SO_2$, 37.4 total % $SO_2$.

Table III

| Sample No. (a) | Conc.NH₄OH, %(Vol.) | NH₃:Bark (w/w) | Time, Hr. | Temp., °C. | Yield (wt.) % | Insoluble Bark Residue Wt. | Total N, % | Ammoniacal N, % | Combined N, % |
| --- | --- | --- | --- | --- | --- | --- | --- | --- | --- |
| 1 | 26.3 | 0.43 | 2 | 170 | 90.6 | 40.0 | 10.3 | 7.5 | 2.8 |
| 2 | 35.1 | 0.52 | 2 | 170 | 92.1 | 41.5 | 10.6 | 7.4 | 3.2 |
| 3 | 43.9 | 0.65 | 2 | 170 | 93.7 | 37.9 | 10.4 | 7.3 | 3.1 |
| 4 | 52.7 | 0.78 | 2 | 170 | 92.7 | 38.5 | 10.3 | 7.1 | 3.2 |
| 5 | 61.5 | 0.91 | 2 | 170 | 91.3 | 39.8 | 10.9 | 7.4 | 3.5 |
| 6 | 70.2 | 1.04 | 2 | 170 | 91.7 | 40.8 | 10.2 | 7.1 | 3.1 |
| 7 | 52.7 | 0.65 | 2 | 170 | 75.9 | 37.0 | 9.3 | 6.6 | 2.7 |

(a) SO₂ liquor analyzed as: 621 g/l total SO₂, 320 g/l free SO₂, 62.1 total % SO₂

50 ml. incremental increases of $NH_4OH$ concentrations were used beginning with 150 ml. in Sample 1.

It is apparent from Tables II and III that increasing $NH_4OH$ concentration has only a minimal effect on yield, total nitrogen or organic nitrogen contents. The combined nitrogen content of 3.5% in Table III, Sample 5 represents an incorporation of 0.86 amine groups per monomeric flavanoid unit. The use of a stronger sulfur dioxide liquor appears to increase yields - compare Tables II and III. This most likely results from increased degradation of polyphenolic bark structure by additional sulfite ion. Combined nitrogen levels of products in Table III are larger than those in Table II, which appear to have the highest total nitrogen contents.

I claim:

1. An aminated sulfite derivative of coniferous tree bark containing from about 8 - 11 percent nitrogen prepared by heating an aqueous solution containing coniferous bark, ammonia and sulfur dioxide at a temperature of from about 130°- 190°C, the ammonia:bark ratio being from about 0.5:1 - 0.9:1 and the $SO_2$:bark ratio being about 0.3:1 - 0.35:1 both on a weight basis, and separating the resulting aqueous bark derivative from the reaction mass.

2. The aminated sulfite derivative of claim 1 prepared from coniferous bark extract.

3. A process for preparing an aminated sulfite derivative of coniferous tree bark comprising heating an aqueous solution containing coniferous bark, ammonia and sulfur dioxide at a temperature of from about 130°- 190°C, the ammonia:bark ratio being from about 0.5:1 - 0.9:1 and the $SO_2$:bark ratio being about 0.3:1 - 0.35:1 both on a weight basis, and separating the resulting aqueous bark derivative from the reaction mass.

4. The process of claim 3 in which the aminated sulfite derivative is prepared from an aqueous solution containing coniferous bark extract.

5. The process of claim 3 in which the aminated sulfite derivative is prepared from an aqueous solution containing comminuted coniferous bark.

6. The process of claim 3 in which the aminated sulfite derivative is prepared from an aqueous solution containing ammonium hydroxide.

7. The process of claim 3 in which the aminated sulfite derivative is prepared from an aqueous solution containing ammonium sulfite.

8. The process of claim 3 in which the aminated sulfite derivative is prepared from an aqueous solution containing ammonium bisulfite.

9. The process of claim 3 in which the aqueous solution is heated for from 1 to 6 hours.

* * * * *